Patented Apr. 24, 1923.

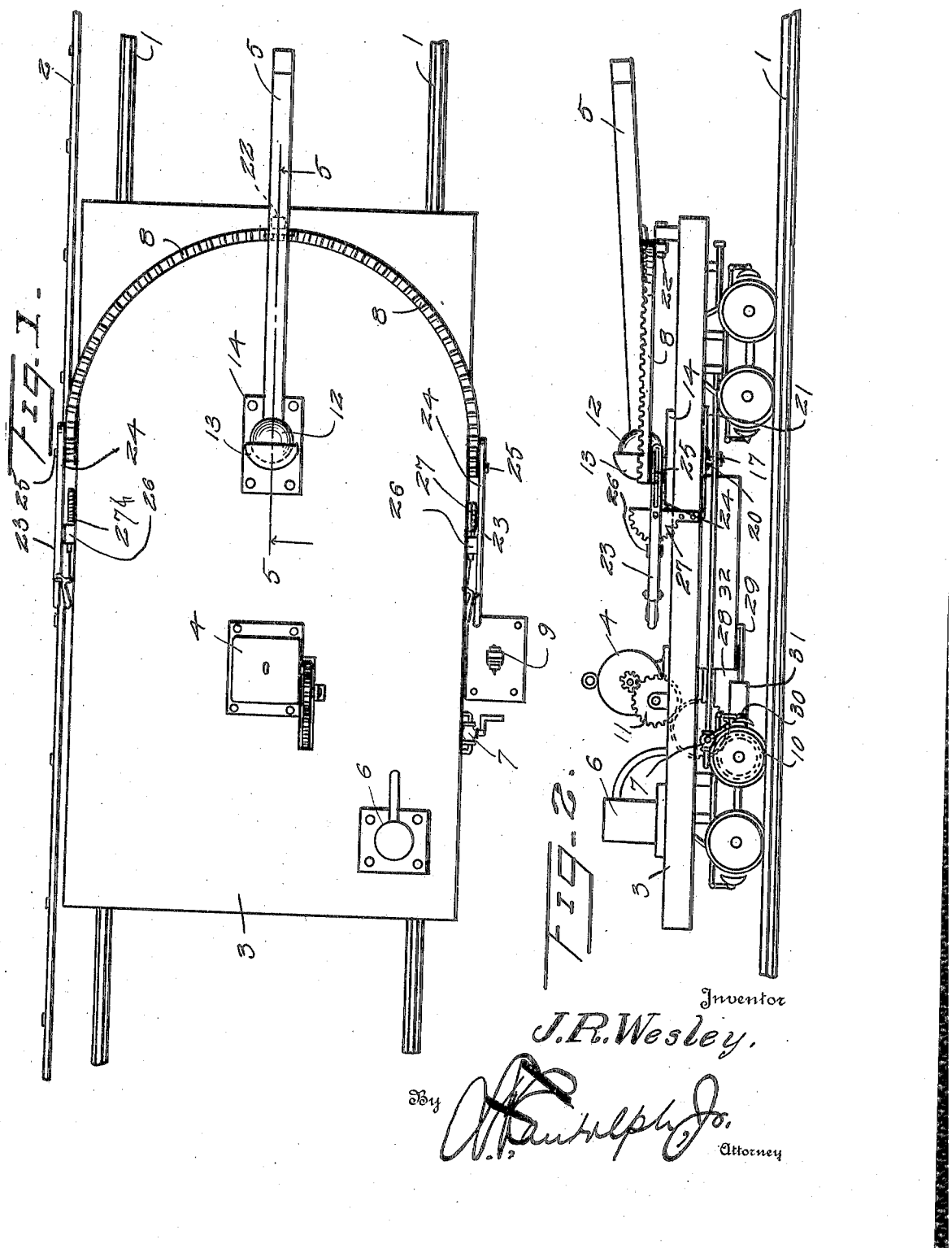

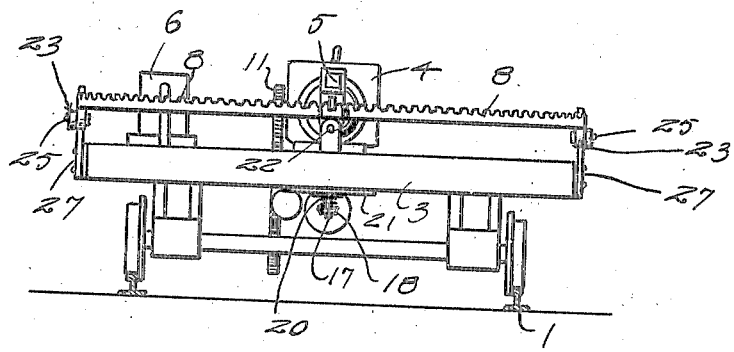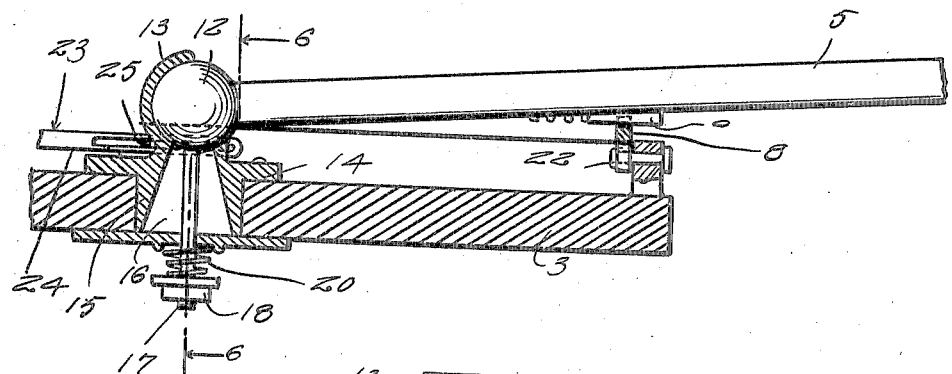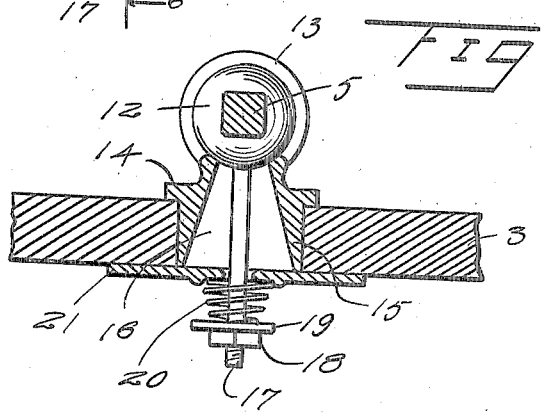

1,453,218

UNITED STATES PATENT OFFICE.

JAMES R. WESLEY, OF CHICAGO, ILLINOIS.

TRUCK AND PUSH POLE FOR SWITCHING CARS.

Application filed January 23, 1922. Serial No. 531,248.

*To all whom it may concern:*

Be it known that I, JAMES R. WESLEY, a citizen of the United States, residing at Chicago, in the county of Cook and State of Illinois, have invented certain new and useful Improvements in Trucks and Push Poles for Switching Cars; and I do hereby declare the following to be a full, clear, and exact description of the invention, such as will enable others skilled in the art to which it appertains to make and use the same.

The invention has relation to means whereby the switching of cars is greatly facilitated and the manual labor required to be expended reduced to the smallest amount possible consistent with efficiency in the attainment of the end for which the present invention is intended.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of the truck and a portion of the track,

Figure 2 is a side view of the parts illustrated in Figure 1.

Figure 3 is a front end view of the truck,

Figure 4 is a detail section on the line 5—5 of Figure 1, looking in the direction of the arrow and showing the parts on a larger scale, and Figure 5 is a sectional detail of the pole and its mountings on the line 6—6 of Figure 4, viewed in the direction of the arrows.

Corresponding and like parts are referred to in the following description and designated in the several views of the drawings by like reference characters.

Upon the track 1 is mounted a truck including a substantial platform 3 upon which are mounted the operating parts, such as an electric motor 4, a pole 5, an air pump 6, a brake valve 7 and notched bars 8, the latter operating to hold the pole 5 in the required adjusted position. A trip 9 is provided at a determinate point in the length of the track 1 and when set is adapted to actuate the brake valve 7, whereby to bring the truck to a full stop.

The motor 4 is of the electric type and is adapted to derive current from the third rail 2 of the track 1 or from the overhead conductor. The drive wheels 10 of the truck are operated by means of the motor 4, whereby to propel the truck when the same is in motion on the track 1. A train of gearing 11 connects the motor with the axle of the drive wheels.

The pole 5 is of substantial structure and is mounted upon the platform 3 of the truck so as to swing laterally and vertically, as required. The notches of the bars 8 form seats to receive the swinging end of the pole 5 and hold the latter in the required adjusted position. The pole 5 is also adapted to be adjusted vertically at its swinging end and suitable means may be provided for this purpose and mounted upon the truck. The pole 5 is provided at its pivotal end with a ball 12 which is seated in a socket 13 mounted upon the platform 3. The socket 13 extends vertically from a plate 14 which is securely attached to the platform 3. A collar 15, pendant from the plate 14, is snugly fitted in an opening formed in the platform 3 and has a flared opening 16 through which a pin 17 passes, the same extending from the ball 12 in line with the center thereof. The flared opening 16 provides for the pivotal movement of the pole 5 in every direction within certain limits. A nut 18 and washer 19 are mounted upon the lower end of the pin 17 and confine and regulate the tension of an expansible helical spring 20 which is mounted upon the lower portion of the pin 17 and confined between a plate 21 and the washer 19. The plate 21 has sliding engagement with the lower side of the platform 3 and is apertured for the passage of the pin 17. The pin 17 and adjunctive parts hold the pivotal end 12 of the pole 5 in the socket 13 in such a manner as to admit of the forward end of the pole 5 moving vertically and laterally so as to assume the required adjusted position. The spring 20 is of conical form and its upper end obtains a firm seating against the lower side of the plate 21.

The toothed bars 8 are pivoted at their inner ends, as indicated at 22, and their outer ends are adjustable vertically by means of levers 23 which are mounted upon the platform 3, slotted arms 24 projecting from the levers and engaging pins 25 projecting laterally from the bars 8. The levers 23 are held in adjusted position by means of latches 26 and toothed segments 27.

In the operation of the invention, the pole 5 is adjusted so that its swinging end engages a car to be moved, after which current is supplied to the motor 4 to impart a propelling force to the truck for moving the car to be switched. When the truck reaches the predetermined point in the length of the track 1, the trip 9 operates the brake valve 7, whereby the truck is automatically brought to a full stop.

The air and brake valve mechanical connections to be connected and used in the following manner: Air pump 6 will pump the air into a tank 32 which in turn will have a pipe connection to brake valve 7; the brake valve will have what is known as a release port and a braking port; the braking port has a pipe leading to a piston valve under the car that is connected direct to the brake beams 30 by a piston and cylinder connection 31, so that when the handle on valve 7 is placed in what is known as braking position, it opens the braking port, which makes a direct pipe line from tank 32 to the brake cylinder 31 whereby the brakes are applied and the car brought to a stop. Upon operating the valve 7 to cut off the pressure from the tank 32, the brake cylinder 31 is bled in a manner well understood thereby releasing the brakes. This system of brake setting is now in general use, and is known as a straight air system.

What is claimed is:

1. In a system for automatically switching cars, a truck, a propelling pole mounted upon the truck and laterally adjustable towards either side of the truck, and a notched bar in cooperative relation with the pole for securing the same in the adjusted position.

2. In a system for automatically switching cars, a truck, a propelling pole mounted upon the truck and adjustable laterally and vertically, and means for securing the propelling pole in the required adjusted position.

3. In combination, a truck, a propelling pole having a ball at its inner end, a socket mounted upon the truck and receiving the ball of the propelling pole, an element forming a part of the socket and having a flared opening, a pin projecting from the ball of the pole and passing through the flared opening of said element, a plate extending across the flared opening and movable with the pin, and a yieldable connection between the pin and plate to retain the parts in operative position without interfering with the pivotal movements of the propelling pole.

In testimony whereof I affix my signature in presence of two witnesses.

JAMES R. WESLEY.

Witnesses:
ELMER W. ADKINSON,
ELLA R. M. ADKINSON.